Jan. 12, 1926.
H. W. MELLING
1,569,518
MILLING MACHINE
Filed Sept. 28, 1923    3 Sheets-Sheet 1
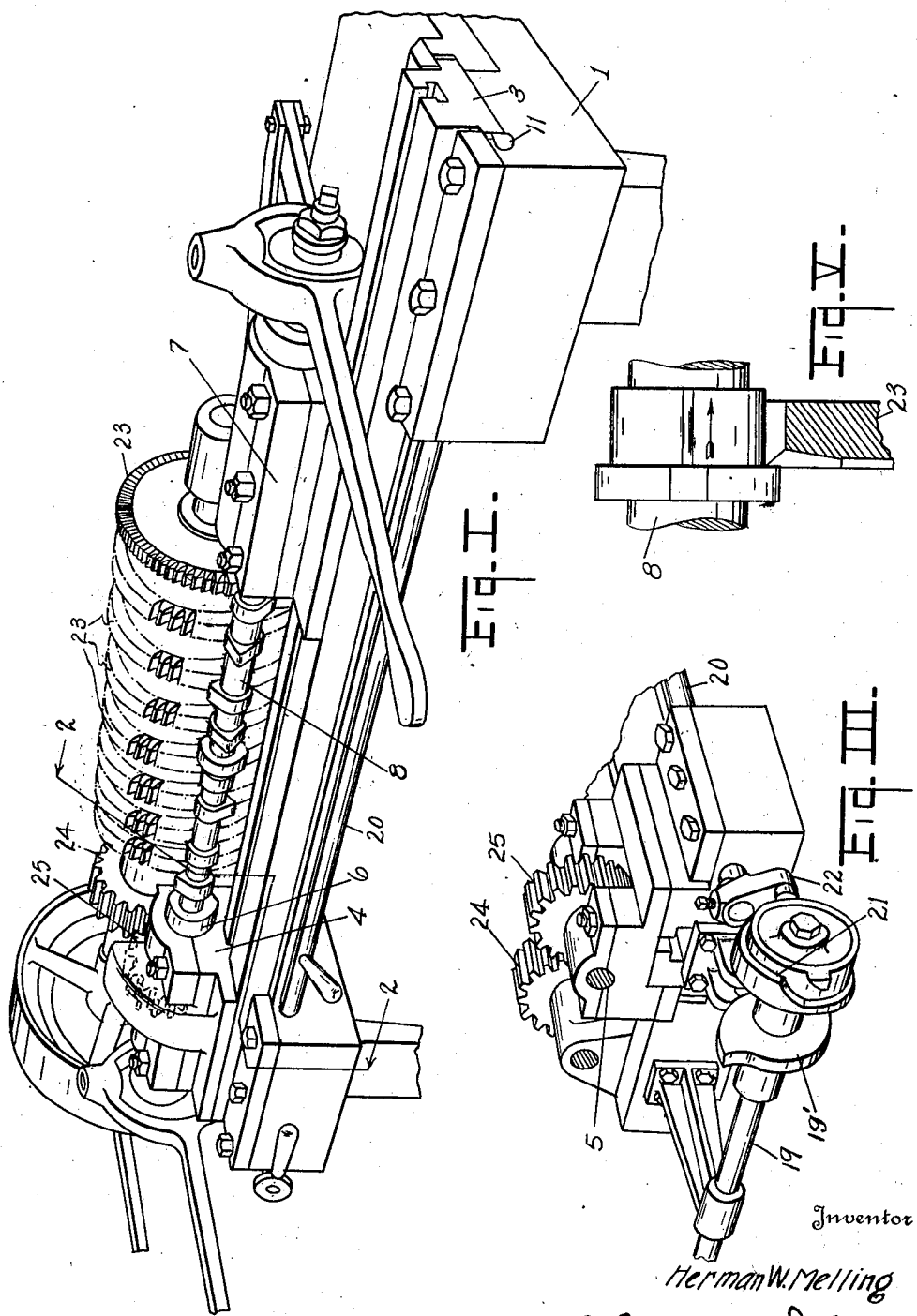
Inventor
Herman W. Melling
By Chappell & Earl
Attorneys Jan. 12, 1926. 1,569,518
H. W. MELLING
MILLING MACHINE
Filed Sept. 28, 1923 3 Sheets-Sheet 2
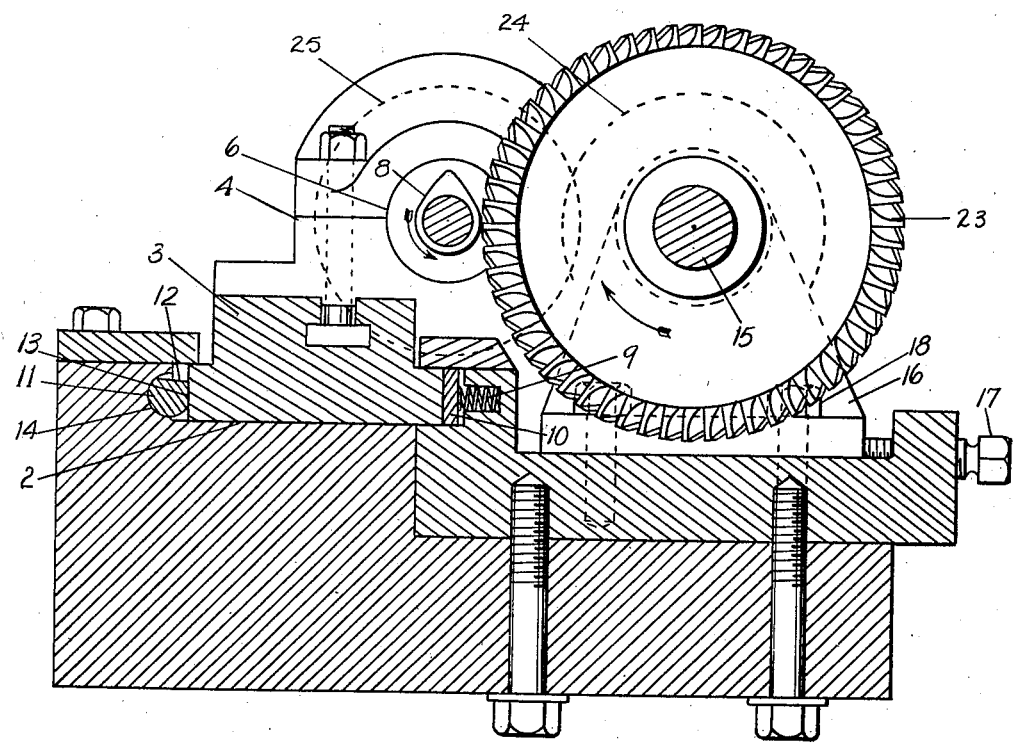
Fig. II.
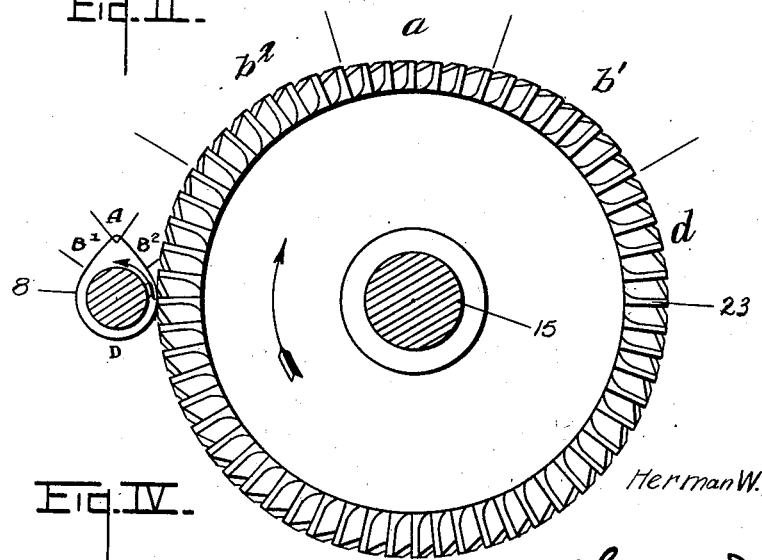
Fig. IV.
Inventor
Herman W. Melling
By Chappell T Earl
Attorneys

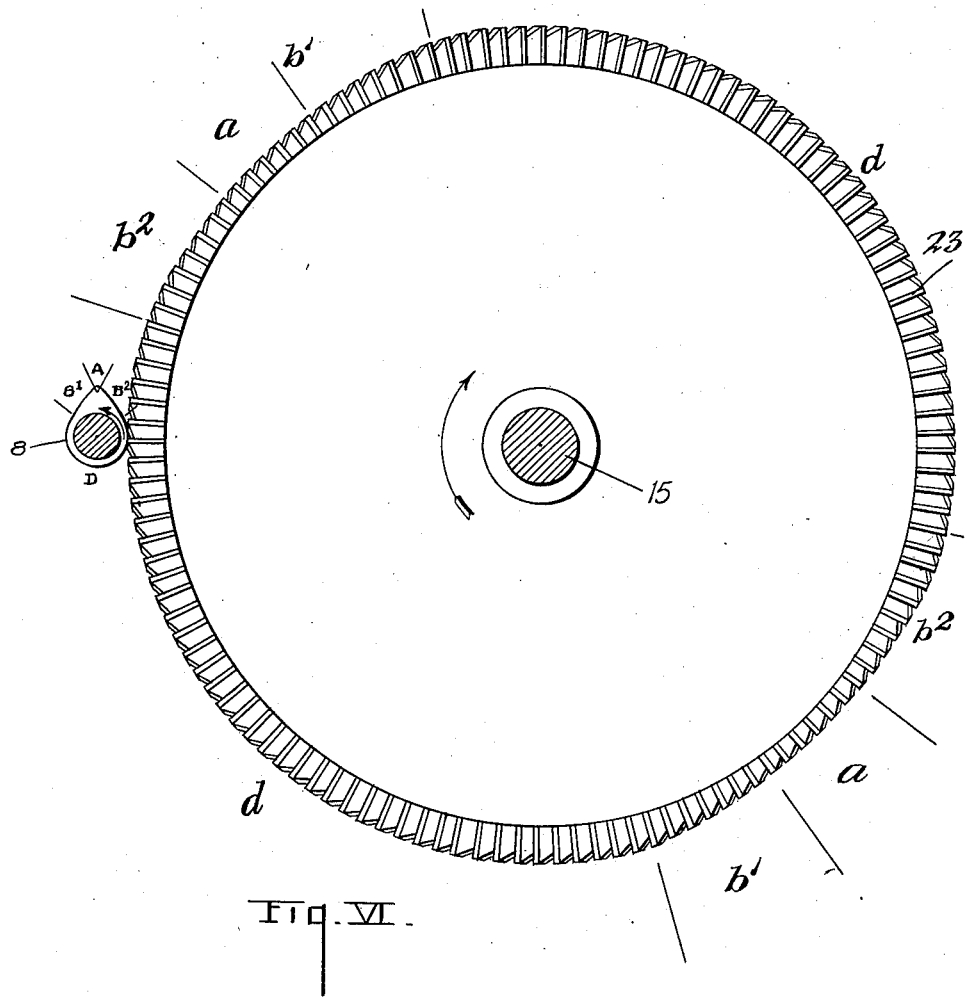

Patented Jan. 12, 1926.

1,569,518

UNITED STATES PATENT OFFICE.

HERMAN W. MELLING, OF JACKSON, MICHIGAN.

MILLING MACHINE.

Application filed September 28, 1923. Serial No. 665,347.

*To all whom it may concern:*

Be it known that I, HERMAN W. MELLING, a citizen of the United States, residing at the city and county of Jackson, State of Michigan, have invented certain new and useful Improvements in Milling Machines, of which the following is a specification.

This invention relates to improvements in milling machines.

The main objects of this invention are:

First, to provide an improved milling machine for machining cam shafts such as used in internal combustion engines.

Second, to provide an improved milling machine for machining work of non-circular cross section.

Third, to provide an improved milling machine which may be readily adjusted for a roughing cut and a finishing cut.

Fourth, to provide a milling machine for work of non-circular cross section which is of very large capacity.

Objects pertaining to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front perspective view of a milling machine embodying the features of my invention, portions of the frame being broken away for convenience in illustration, one of the cutters being shown in full lines and the others being indicated by dotted lines.

Fig. II is a vertical transverse section on a line corresponding to line 2—2 of Fig. I.

Fig. III is a detail front perspective view looking from the left of Fig. I showing details of the driving and feed means.

Fig. IV is an enlarged vertical section through the cutter shaft of the work showing details of the cutter and its relation to the work.

Fig. V is a detail plan view showing the relation of the work and cutter, the cutter being sectioned.

Fig. VI is a detail vertical section through the cutter shaft and work showing a modified form of cutter.

In the drawing the sectional view is taken looking in the direction of the little arrows at the end of the section line and similar numerals of reference indicate similar parts throughout the several views.

Referring to the drawing, the bed 1 is provided with a suitable way 2 for the work carriage 3. The carriage is provided with a head stock 4 provided with a live spindle 5 having a chuck shown conventionally at 6. The tail chuck 7 is also provided with a suitable chuck for the work 8.

The machine illustrated is especially designed for the machining of cam shafts of internal combustion engines and the work 8 illustrated is such a shaft.

The work carriage 3 is supported for lateral adjustment in the way 2 to regulate the depth of cut, the main object being to provide for a roughing cut and a finishing cut without removing the work from the machine. The spring 9, of which there is a plurality, one only being shown, urges the carriage forward, wear plates 10 being interposed between the springs and the carriage. The carriage is adjusted against the tension of these springs by means of cams 11, see Fig. II, the cams having flattened surfaces 12 which allow the carriage to return to neutral position and the surfaces 13 which are in engagement with the carriage during the rough cut and surfaces 14 which support the carriage for the finish cut.

I have not in the accompanying drawing attempted to maintain or illustrate the relative proportion of parts but it will be understood that the variation between the cam faces is such as to provide the desired depth of cut.

The cutter shaft 15 is supported on the bearing pedestals 16 adjustably mounted upon the bed, adjusting screws 17 being provided for these pedestals, the pedestals being held in their adjusted position by the tap bolts 18. This cutter shaft 15 is connected to the spindle 5 by the gears 24 and 25. These gears are of the same dimensions and are arranged in meshing relation so that the work and the cutter shaft are driven at the same speed and in opposite directions.

The carriage is driven from the cam 19' on the shaft 19, the means for driving this shaft 19 not being illustrated as they form no part of this invention. The shaft 20 for the carriage cams 11 is controlled by the cam 21 on the shaft 19, the cam 21 acting upon an arm 22 on the shaft 20. This secures an automatic actuation for the carriage adjusting cam providing for a roughing cut and then a finishing cut without removing the work from the machine.

The cutters 23 are arranged upon the cutter shaft 15 in proper spaced relation to coact with the several cams upon the work 8. These cams in the work illustrated have dwell portions D and lift portions $B^1$, $B^2$ and A which are non-concentric to the work. The cutter 23 is non-circular in its peripheral contour, its shape being complementary to the finished work, that is, it is provided with a portion $d$ concentric with the axis of the cutter shaft, the portion $d$ of the cutter cutting the concentric portion D of the work and the non-concentric portions $b^1$, $b^2$ and $a$ cutting the lift parts $B^1$, $B^2$ and A of the work.

The cutters and the work are, in the embodiment shown in Figs. I–V, inclusive, driven in opposite directions and at the same speed, the gears 24 and 25 being, as stated, of the same size and arranged in mesh. The cutter is of a diameter substantially greater than that of the work.

In the modification shown in Fig. VI the cutter 23 is provided with two concentric portions $d$ and two non-concentric portions $b^1$, $b^2$, and $a$, the work being driven at twice the speed of the cutter. The same conditions prevail, that is, the cutter is complementary of the work, it having concentric portions cutting the concentric portion of the work and non-concentric portions which cut the non-concentric portion of the work.

In Figs. I and IV the cams are shown in their finished shape. In Fig. V the work is shown as partially cut, it being understood that these cam shafts are usually drop forgings, the cams being roughly shaped and are in my machine machined to the desired contour, the cams being automatically finish ground and case hardened as succeeding steps.

My improved milling machine is of very large capacity, the cams are accurately shaped and it does not require expert machinists to operate the machine.

I have illustrated and described my improvements in embodiments which I consider very practical. I have not attempted to illustrate or describe certain modifications or adaptations which I contemplate as I believe the disclosure made will enable those skilled in the art to which my invention relates to embody or adapt the same as may be desired.

Having thus described my invention what I claim as new and desire to secure by Letters Patent is:

1. In a machine for milling cam shafts having a plurality of cams disposed thereon with adjacent cams in non-aligning relation, the combination of a work carriage mounted for adjustment laterally of the plane of its feed travel and provided with work supporting and driving means including a live spindle, feed means for said work carriage, means for laterally adjusting said carriage, a cutter shaft disposed parallel to said live spindle, means for driving said cutter shaft and spindle at the same speed and in opposite directions, and a plurality of milling cutters having non-circular peripheral contours complementary to that of the cams to be machined and a diameter substantially greater than that of such cams, said cutters being positioned on the cutter shaft in a relation corresponding to that of the cams on the cam shaft.

2. In a machine for milling cam shafts having a plurality of cams disposed thereon with adjacent cams in non-aligning relation, the combination of a work carriage provided with work supporting and driving means including a live spindle, feed means for said work carriage, a cutter shaft disposed parallel to said live spindle, means for driving said cutter shaft and spindle at the same speed and in opposite directions, and a plurality of milling cutters having non-circular peripheral contours complementary to that of the cams to be machined and a diameter substantially greater than that of such cams, said cutters being positioned on the cutter shaft in a relation corresponding to that of the cams on the cam shaft.

3. In a machine for milling work of non-circular contour, the combination of a work carriage mounted for adjustment laterally of the plane of its feed travel and provided with work supporting and driving means including a live spindle, feed means for said work carriage, means for laterally adjusting said carriage, a cutter shaft disposed parallel to said live spindle, means for driving said cutter shaft and spindle in synchronism, and a cutter on said cutter shaft having a non-circular peripheral contour complementary to that of the work to be machined and a diameter substantially greater than that of the work so that the peripheral speed of the cutter is substantially greater than that of the work.

4. In a machine for milling work of non-circular contour, the combination of a work carriage provided with work supporting and driving means including a live spindle, feed means for said work carriage, a cutter shaft disposed parallel to said live spindle, means for driving said cutter shaft and spindle in synchronism, and a cutter on said cutter shaft having a non-circular peripheral contour complementary to that of the work to be machined and a diameter substantially greater than that of the work so that the peripheral speed of the cutter is substantially greater than that of the work.

5. The combination in a machine for machining work of non-circular contour, of a work carriage provided with a work supporting and driving means, feed means for said carriage, a cutter shaft disposed with its axis in a plane parallel to the path of travel of the carriage, driving means for said work driving means and cutter shaft whereby they are driven at the same speed and in opposite directions and in synchronism, and a cutter on said cutter shaft, said cutter being of non-circular contour complementary to that of the work so that the peripheral speed of the cutter is substantially greater than that of the work.

6. The combination in a machine for machining work of non-circular contour, of a work carriage provided with a work supporting and driving means, feed means for said carriage, a cutter shaft disposed with its axis in a plane parallel to the path of travel of the carriage, driving means for said work driving means and cutter shaft whereby they are driven in synchronism, and a cutter on said cutter shaft, said cutter being of non-circular contour complementary to that of the work so that the peripheral speed of the cutter is substantially greater than that of the work.

7. The combination in a machine for machining work of non-circular contour, of a work supporting and driving means, a cutter having a non-circular contour complementary to that of the work to be machined, and a diameter substantially greater than that of the work, and means for driving said cutter at the same speed and in a direction opposite to the direction of the rotation of the work so that the peripheral speed of the cutter is substantially greater than that of the work.

8. The combination in a machine for machining work of non-circular contour, of a work supporting and driving means, a cutter having a non-circular contour complementary to that of the work to be machined and a diameter substantially greater than that of the work, and means for driving said cutter in synchronism with the work so that the peripheral speed of the cutter is substantially greater than that of the work.

In witness whereof, I have hereunto set my hand.

HERMAN W. MELLING.